Dec. 10, 1957 J. W. EDENS ET AL 2,816,222

MIXING CIRCUIT FOR SUPERHETERODYNE RECEIVERS

Original Filed July 5, 1951

INVENTOR.
Jan Wigbolt Edens
Jan Stolk

BY Fred M. Vogel
Agent

United States Patent Office 2,816,222

Patented Dec. 10, 1957

2,816,222

MIXING CIRCUIT FOR SUPERHETERODYNE RECEIVERS

Jan Wigbolt Edens and Jan Stolk, Eindhoven, Netherlands, assignors, by mesne assignments, to North American Philips Company, Inc., New York, N. Y., a corporation of Delaware Original application July 5, 1951, Serial No. 235,286, now Patent No. 2,737,580, dated March 6, 1956. Divided and this application December 1, 1955, Serial No. 554,600

Claims priority, application Netherlands July 8, 1950

1 Claim. (Cl. 250—20)

This patent application is a division of U. S. patent application Serial No, 235,286, now U. S. Patent No. 2,737,580, issued March 6, 1956.

The invention relates to improvements in the mixing-circuit arrangement described and claimed in the copending U. S. application Ser. No. 144,328, filed February 15, 1950. In this application there is described a superheterodyne receiving circuit-arrangement for ultra short waves comprising a discharge tube operating as a mixer having at least a cathode, an anode and two intermediate grids. A signal oscillation and a local oscillator oscillation is applied across the grid nearest to the cathode, whereas the intermediate-frequency oscillations are taken from an impedance included in the anode circuit. The inductance of the oscillator circuit determining the local oscillation frequency is connected between the two grids, if necessary with the interposition of a capacitor, the ends of this inductance being connected to the cathode, while the signal oscillations are fed via a tap on said inductance, preferably the center, to the mixer.

The object of the present invention is to improve the arrangement in the above-described copending application whereby a more effective adaptation of the signal circuit to a preceding high-frequency amplifying tube or a transmission line is obtained with increased amplification.

The improvement according to the invention resides in that the signal oscillation is supplied to the local oscillator circuit through a bandpass filter, to which the output circuit of a preceding high-frequency amplifying tube or a transmission line is connected and which is formed, at least in part, by the oscillator circuit. The input part of the bandpass filter is preferably adjustable with the use of an adjusting impedance, which is varied simultaneously with the adjusting impedance of the oscillator circuit, the latter adjusting impedance serving at the same time for the adjustment of the output part of the bandpass filter.

If the oscillator frequency exceeds the signal frequency, use may be made of a normal bandpass filter comprising two inductively coupled tuned circuits. If the oscillator frequency is lower than the signal frequency, it is in general necessary to connect capacitors in series with the intercoupled coils of the tuned circuits of the bandpass filter.

In the circuit-arrangement according to the invention it is possible to simplify the bandpass filter. In one embodiment of the improved circuit-arrangement according to the invention the tap of the oscillator circuit to which the signal oscillations are supplied is connected through an inductance to the anode of the preceding high-frequency amplifying tube or to an output terminal of the preceding transmission line, in which the point connected to the anode, or in the event of a transmission line, a corresponding point of the inductance is grounded through an adjusting impedance, and in addition a point of the inductance located between the ends is grounded. If the oscillator frequency is chosen to be lower than the signal frequency, the first circuit of the bandpass filter may be built up from a variable or non-variable capacitor with which the series combination of an inductance and a fixed capacitor connected to the low potential point of the circuit is connected in parallel, the common point of the last-mentioned elements being connected to a tap in the inductance of the oscillator circuit. Also in this case the resultant bandpass filter is materially simplified, since there is no need for an inductive coupling between the circuits.

In order that the invention may be more clearly understood and readily carried into effect, it will now be described more fully with reference to the accompanying drawing, wherein.

Figures 1, 2, 3, 4:
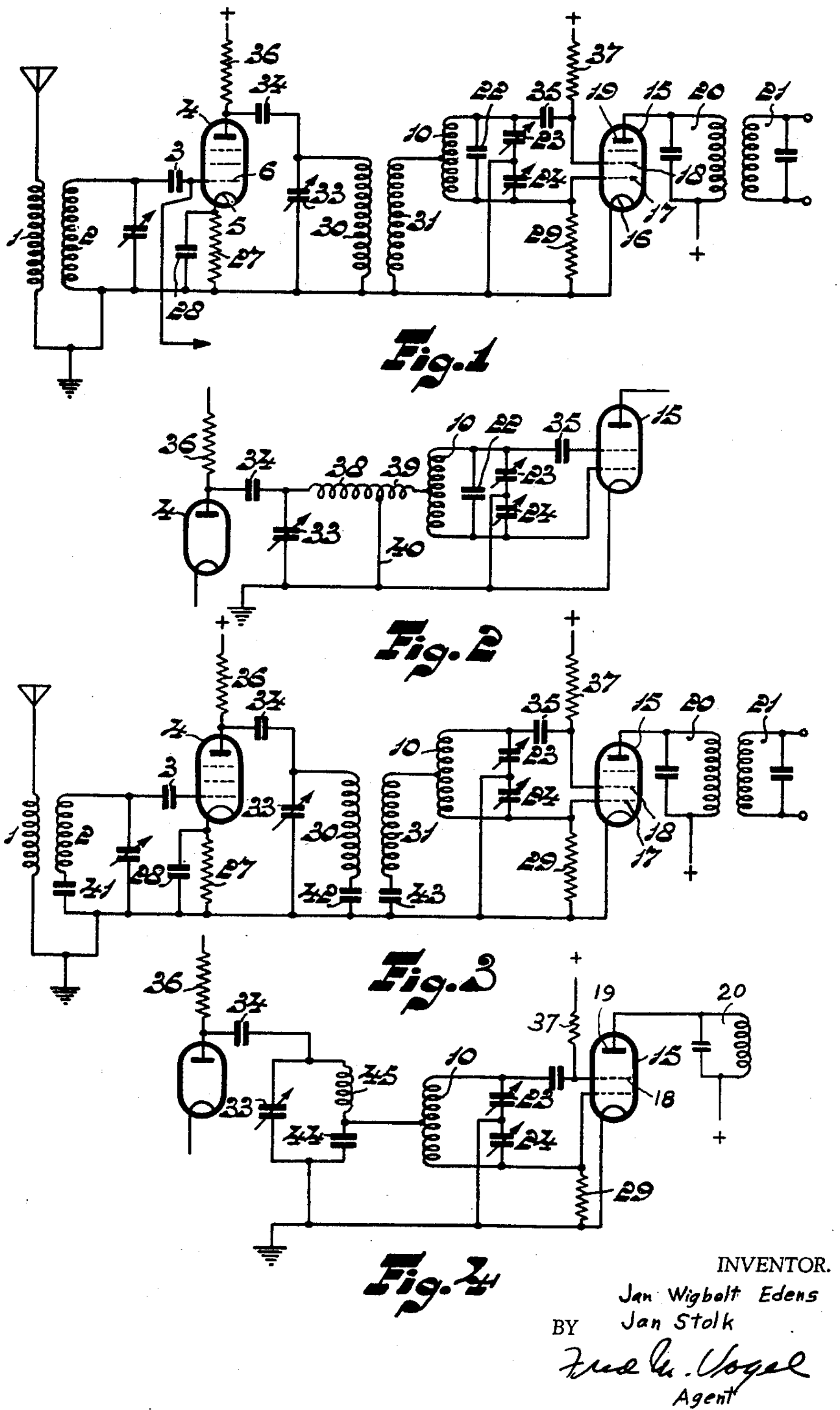
Fig. 1 shows schematically one embodiment of circuit-arrangement according to the invention, comprising, a high-frequency amplifying stage and a mixing stage, the oscillator frequency being higher than the signal frequency.
Fig. 2 shows a simplified construction of the circuit-arrangement shown in Fig. 1.
Fig. 3 shows another embodiment, in which the oscillator frequency is lower than the signal frequency
Fig. 4 shows a simplified embodiment of the circuit-arrangement shown in Fig. 3.

In the circuit-arrangement shown in Fig. 1 the high-frequency signal oscillations developed in the aerial circuit 1 are inductively fed to the input circuit 2, tuned to the signal frequency, one end of the input circuit 2 being connected through a capacitor 3 to the control-grid 6 of a high-frequency amplifying tube 4, shown as a pentode, the other end being grounded. Between the cathode and ground provision may be made of the parallel combination of a resistor 27 and a capacitor 28, so that the grid has the correct bias voltage. Instead of this voltage or in addition to this voltage for automatic volume control may be supplied to the grid, this voltage varying with the mean carrier wave amplitude.

The anode voltage is supplied through an impedance, which is shown here as a resistor 36. The amplified signal oscillations from the anode of tube 4 are supplied through a capacitor 34 to a circuit comprising an inductance 30, a tuning capacitor 33, the end of the circuit remote from the anode being connected to ground. The inductance 30 is coupled with an inductance 31, of which the lower end is also grounded, the upper end thereof being connected to a tap on inductance 10. The latter forms part of the local oscillator circuit proper, which furthermore comprises the identical tuning capacitors 23 and 24, which are variable in an identical manner. These capacitors are mechanically coupled in a conventional manner with the tuning capacitor 33 of the first circuit of the bandpass filter and the tuning capacitor of the circuit 2. The common point of capacitors 23 and 24 is grounded. Parallel with the coil 10 is connected a trimming capacitor 22, which serves to diminish the whole tuning range of the oscillator circuit in a manner such that throughout the tuning range approximately the correct difference frequency is obtained. The local oscillator tuning itself must invariably exceed the tuning of the signal circuits.

The circuit 10, 23, 24 is connected, in a manner similar to that described in the above-identified copending application, between the first grid 17 and the second grid 18 of a mixer 15, constructed as a pentode, the anode 19 of which is connected through a primary circuit 20 of an intermediate-frequency bandpass filter 20, 21 to the voltage supply. The grid 18 operates as the local oscillator anode and is connected through a resistor 37 of high value to the positive terminal of the voltage supply. A blocking capacitor 35 is connected between the oscillator circuit and the grid 18. The control-grid 17 is connected through a leak resistor 29 to the cathode 16 and furthermore to ground.

The inductance 31, together with the oscillator circuit, form the secondary circuit of a bandpass filter for the high-frequency oscillations. If the local oscillator frequency exceeds the signal frequency, the oscillator circuit between the upper end of the inductance 31 and ground has the function of a capacity, the value of which varies with the adjustment of the identical capacitors 23 and 24. This ensures that simultaneously with the tuning of the oscillator circuit, the second circuit of the band-pass filter, comprising the coil 31 and the oscillator circuit, is approximately tuned to the signal frequency. The value of the capacitor 22 does not affect the frequency of the said second circuit of the band-pass filter, so that by adjusting this capacitor the oscillator frequency can be readjusted in a manner such that approximately the correct difference frequency is obtained in the frequency range to be covered. By suitable proportioning and coupling the elements 30 and 31, the most favorable adaptation of the output impedance of the tube 4 to this tube may be obtained.

Instead of using capacitative tuning, use may be made of inductive tuning. In this case the coils 30, 31 and 10 and the inductance of the circuit 2 may be provided with mechanically ganged, slidable ferromagnetic cores. If it is only required to receive a restricted number of wavelengths, the sail coils may be provided with taps, so that, with the use of a waveband switch, parts thereof may be short-circuited.

In the circuit-arrangement described the bandpass filter may be considerably simplified by using the arrangement shown in Fig. 2. In this case the inductances 30 and 31 are replaced by a single inductance, a point of which is grounded through a conductor 40. Instead of using this single inductance, use may be made of two series-connected coils, between which a certain coupling prevails. Otherwise the circuit-arrangement is completely identical with that shown in Fig. 1. The grounded point of the said inductance is preferably chosen such that one part 39 has a materially lower inductance than the other part 38. Thus, for example, in a television receiver, part 38 may comprise seven turns and part 39 two turns. Also in this circuit-arrangement it is possible in a simple manner to obtain a tuning by the variation of the inductances of the various circuits. In this case it is even more simple, since for the said part only the inductance 38 need be varied together with the inductance 10 and that of the circuit 2. The adaption of the output impedance of tube 4 is obtained by a correct choice of the grounded point of the inductance 38, 39.

Fig. 3 shows a circuit-arrangement similar to that shown in Fig. 1; it is assumed here, however, that the oscillator frequency is lower than the signal frequency.

The circuit-arrangement is distinguished from that shown in Fig. 1 in that the capacitor connected in parallel with the coil 10 is omitted and in that fixed capacitors 42 and 43 are connected in series with the coils 30 and 31. In order to ensure a satisfactory synchronization with the circuit 2, in a simple manner, the coil of the latter is also connected in series with a fixed capacitor 41. The capacitors 41, 42 and 43 diminish the tuning range of the circuits tuned to the signal frequency. The value of the capacitor 43 does not affect the natural frequency of the oscillator circuit; the desired frequency difference between the oscillator circuit and the other circuits may be adjusted with the use of capacitors 41, 42 and 43. However, these capacitors preferably have fixed values and the frequency difference is adjusted with the use of a trimming capacitor connected in parallel with the oscillator circuit.

Fig. 4 shows a circuit-arrangement, which may be considered as a simplified embodiment of that shown in Fig. 3. The first circuit of the bandpass filter here comprises not only the tuning capacity 33 but also the series combination of a coil 45 and a capacitor 44, a terminal of the latter being grounded. The common point of the latter elements is directly connected to the tap of the coil 10 of the oscillator circuit. In this case there is a capacitative coupling between the circuits 33, 44 and 45 and the oscillator circuit, thus forming together the bandpass filter. In this case the capacitor 44 is a coupling capacity, with the use of which the correct frequency difference may be adjusted. Moreover, the degree of coupling between the two parts of the coil 10 is of importance, so that it is desirable to construct this coil in a manner such that the coupling between the two parts is adjustable.

It has been found that in the circuit-arrangement described above a satisfactory synchronization with constant frequency differance between the oscillator circuit and the preceding high-frequency circuits is obtainable.

The circuit-arrangements are particularly suitable for the high-frequency portion of television receivers. If in this case the signals are supplied through a transmission line in the form of a high-frequency cable, the circuit-arrangement also make it possible to obtain in a simple manner a satisfactory matching or a reefiction-free termination of the cable. In the circuit-arrangement shown in Fig. 1 the transmission line may in this case be connected to a tap of the coil 30. In the circuit-arrangement shown in Fig. 3 it is in general possible to obtain a satisfactory matching by connecting the transmission line to the capacitor 42. In the circuit-arrangement shown in Figs. 2 and 4 the transmission line may be coupled in the sense of a transformer, with the coil 38 or 45 by means of a coil connected to the line.

A further advantage of the circuit-arrangements described above is that the oscillator radiation through the aerial, which is due to the inevitable tolerance at the area of the tap of the coil 10 is very small owing to the greater selectivity of a bandpass filter as compared with a single circuit.

What we claim is:

In a superheterodyne receiver provided with an amplifying stage for incoming signal oscillations and including an electron discharge tube having an output electrode, apparatus for mixing the amplified signal oscillations with local oscillations to produce an intermediate frequency wave comprising an electron discharge tube having a cathode, two grids and an anode, means to apply positive potentials relative to cathode to said anode and to the one of said two grids which is nearest said anode, an oscillatory network tuned to said local oscillations, said network including an inductance coupled between said two grids and two capacitances connected between respective ends of said inductance and said cathode, means including a band-pass filter tuned for passing the amplified signal and connected to couple said amplifying stage to said mixing apparatus, said filter including a variable capacitor having one end coupled to the output electrode and the other end to ground, and an inductor connected in series with a condenser across said capacitor, the junction of said inductor and said condenser being connected to a tap on the inductance in said network, and means coupled to said anode to derive said intermediate wave therefrom.

References Cited in the file of this patent

UNITED STATES PATENTS

| | | |
|---|---|---|
| 1,912,616 | Bailey | June 6, 1933 |
| 2,231,389 | Koffyberg | Feb. 11, 1941 |
| 2,662,171 | Cock et al. | Dec. 8, 1953 |